United States Patent
Xu et al.

(10) Patent No.: US 12,366,907 B2
(45) Date of Patent: Jul. 22, 2025

(54) COMMUNICATIONS DEVICE CONTROL METHOD AND APPARATUS

(71) Applicant: Huawei Technologies Co., Ltd., Shenzhen (CN)

(72) Inventors: Xiaodong Xu, Beijing (CN); Hongjie Wu, Beijing (CN); Yifei Jiang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 17/466,038

(22) Filed: Sep. 3, 2021

(65) Prior Publication Data

US 2022/0075436 A1     Mar. 10, 2022

(30) Foreign Application Priority Data

Sep. 7, 2020 (CN) .......................... 202010930572.5

(51) Int. Cl.
*G06F 1/3206* (2019.01)
*G06F 1/3287* (2019.01)
*H04B 1/401* (2015.01)

(52) U.S. Cl.
CPC .......... *G06F 1/3206* (2013.01); *G06F 1/3287* (2013.01); *H04B 1/401* (2013.01)

(58) Field of Classification Search
CPC .... G06F 1/3206; G06F 1/3287; G06F 1/3203; G06F 11/3031; G06F 11/3055; G06F 11/3058; G06F 11/2033; G06F 9/44505; G06F 1/206; H04B 1/401
See application file for complete search history.

(56) References Cited

U.S. PATENT DOCUMENTS

| | | | |
|---|---|---|---|
| 2002/0112075 A1* | 8/2002 | Takashimizu | G06F 11/2025 709/224 |
| 2005/0004717 A1* | 1/2005 | Fukushima | G06F 1/206 700/299 |
| 2005/0078600 A1 | 4/2005 | Rusmisel et al. | |
| 2008/0007192 A1* | 1/2008 | Williams | H03G 3/3042 318/471 |
| 2013/0279918 A1 | 10/2013 | Mizutani et al. | |
| 2018/0007638 A1 | 1/2018 | Kanno | |

FOREIGN PATENT DOCUMENTS

| | | |
|---|---|---|
| CN | 102622075 A | 8/2012 |
| CN | 106066684 B | 3/2019 |

* cited by examiner

*Primary Examiner* — Paul Yen
(74) *Attorney, Agent, or Firm* — Conley Rose, P.C.

(57) ABSTRACT

A communications device control method comprises obtaining, by the communications device control apparatus, a first parameter in response to a trigger condition, and quickly controlling, by the communications device control apparatus using the first parameter, a transceiver to be powered on such that the first device exits the warm backup state and process service traffic that is received. The first parameter is a working parameter that is used to start the transceiver and that is pre-stored by the communications device control apparatus.

23 Claims, 3 Drawing Sheets

S201
A first device obtains a first parameter in response to a trigger condition S202
The first device controls, by using the first parameter, a transceiver to be powered on, so that the first device exits a warm backup state

COMMUNICATIONS DEVICE CONTROL METHOD AND APPARATUS

CROSS-REFERENCE TO RELATED APPLICATIONS

This application claims priority to Chinese Patent Application No. 202010930572.5, filed on Sep. 7, 2020, which is hereby incorporated by reference in its entirety.

TECHNICAL FIELD

This application relates to the field of communications technologies, and in particular, to a communications device control method and apparatus.

BACKGROUND

In a data transmission process, to ensure transmission reliability, a communications device used in data transmission usually supports a backup function. A communications device shown in FIG. 1 may include an active service processing board and a standby service processing board. When working properly, both the active service processing board and the standby service processing board receive data from a subcard (or an interface board) and perform same processing operations. However, the subcard sends only data processed by the active service processing board to a physical port. When the active service processing board is faulty, an entire service can be quickly switched over to the standby service processing board. This improves data transmission reliability.

SUMMARY

Embodiments of this application provide a communications device control method and apparatus, to resolve a problem of improving data transmission reliability while a communications device is working at low power consumption and energy-saving mode.

According to a first aspect of the embodiments of this application, a communications device control method is provided. The method includes: A first device in a warm backup state obtains a first parameter in response to a trigger condition, where the warm backup state indicates that a transceiver of the first device is in a low power consumption state, and the first parameter is used to indicate the transceiver to run based on the first parameter; and the first device controls, using the first parameter, the transceiver to be powered on such that the first device exits the warm backup state. In this implementation, the transceiver is quickly started in a manner of pre-storing the first parameter such that the first device quickly enters a working state, and the transceiver can work reliably without a plurality of times of parameter adjustment. This improves service processing efficiency and an active/standby reliability protection capability.

In a possible implementation, before the first device obtains the first parameter, the method further includes: When the transceiver is in a power-on state, the first device obtains a third ambient temperature, where the third ambient temperature is a current ambient temperature; and when the first device determines that a difference between the third ambient temperature and a first preset temperature falls within a preset range, the first device saves a running parameter corresponding to the transceiver as the first parameter, and controls the transceiver to be powered off such that the first device enters the warm backup state. In this implementation, the first device may prestore a running parameter that enables the transceiver to quickly enter an optimal state or a better state during power-on. When the transceiver needs to be controlled to be powered on, the first device may control, using the running parameter, the transceiver to be powered on.

In a possible implementation, the method further includes: When the transceiver is in a power-on state, the first device obtains an ambient temperature in a preset time period; and when the first device determines that the ambient temperature in the preset time period converges, the first device determines the first preset temperature based on the ambient temperature in the preset time period, where the first preset temperature is an average value or an intermediate value of the ambient temperature in the preset time period. In this implementation, because the running parameter for controlling the transceiver to be powered on is related to a temperature, when the transceiver is powered on, the first device may determine a temperature value for storing the first parameter such that the stored first parameter can enable the transceiver to quickly enter a stable working state.

In a possible implementation, that the first device obtains the first parameter includes: The first device determines the first parameter based on a first ambient temperature and a stored correspondence table. The correspondence table includes a correspondence between the first ambient temperature and the first parameter, and the first ambient temperature is a current temperature of an environment in which the first device is located. In this implementation, the first device may determine the first parameter based on the pre-stored correspondence table and the current ambient temperature, to control, using the first parameter corresponding to the current ambient temperature, the transceiver to be powered on.

In a possible implementation, that the first device obtains the first parameter includes: The first device obtains a running parameter corresponding to the transceiver when the transceiver is powered off at a first moment, and determines the running parameter as the first parameter. There is no power-on operation on the transceiver from the first moment to a current moment. In this implementation, the first device may control, using the running parameter corresponding to a latest power-off moment, the transceiver to be powered on again, where the running parameter corresponding to the latest power-off moment can ensure that the transceiver can quickly enter an optimal running state or a better state during power-on.

In a possible implementation, that the first device obtains the first parameter includes: The first device obtains a first ambient temperature and a second ambient temperature, where the first ambient temperature is a current temperature of an environment in which the first device is located, and the second ambient temperature is an ambient temperature corresponding to the transceiver when the transceiver is powered off at the first moment; the first device obtains a correction parameter based on a difference between the first ambient temperature and the second ambient temperature; and the first device corrects the running parameter using the correction parameter, to obtain the first parameter. In this implementation, because the running parameter is related to an ambient temperature, to ensure that the running parameter for controlling the transceiver to be powered on corresponds to the current ambient temperature, when the running parameter corresponding to the latest power-off moment is obtained, an ambient temperature corresponding to the running parameter and the current ambient temperature may be further obtained; the correction parameter for the running parameter is determined based on a temperature difference between the ambient temperature corresponding to the running parameter and the current ambient temperature; and using corrected first parameter, the transceiver is controlled to be powered on.

In a possible implementation, the first parameter includes a startup parameter and/or a calibration parameter, the startup parameter is used to indicate the transceiver to be started based on the startup parameter, and the calibration parameter is used to calibrate the transceiver.

In a possible implementation, the method further includes: When the first device exits the warm backup state, the first device controls a heat dissipation device to run in a first working mode, where heat dissipation efficiency of the heat dissipation device in the first working mode is higher than preset heat dissipation efficiency. In this implementation, to avoid a large temperature change caused when the first device exits the warm backup state, the temperature change is suppressed by improving heat dissipation efficiency of the heat dissipation device.

In a possible implementation, the method further includes: When a preset condition is met, the first device controls the heat dissipation device to run in a second working mode, where the heat dissipation efficiency of the heat dissipation device in the first working mode is higher than heat dissipation efficiency of the heat dissipation device in the second working mode, and the preset condition includes that working duration of the heat dissipation device in the first working mode reaches preset duration or a working temperature of the transceiver is lower than a second preset temperature.

In a possible implementation, the trigger condition includes: (a) An active/standby switchover is performed, where a second device is an active device, and the first device is a standby device; or (b) a difference between two adjacent first preset temperatures is greater than a first preset temperature difference; or (c) a power-on condition preconfigured by a user is met; or (d) a difference between a real-time ambient temperature value and the first preset temperature is greater than a second preset temperature difference.

In a possible implementation, that the first device obtains the first parameter includes: The first device reads the first parameter locally; or the first device obtains the first parameter from an external device.

According to a second aspect of the embodiments of this application, a communications device control apparatus is provided. The apparatus includes: An obtaining unit is configured to obtain a first parameter in response to a trigger condition by a communications device in a warm backup state, where the warm backup state indicates that transceiver of the first device is in a low power consumption state, and the first parameter is used to indicate the transceiver to run based on the first parameter; and a control unit is configured to control, using the first parameter, the transceiver to be powered on such that the communications device exits the warm backup state.

In a possible implementation, the apparatus further includes a storage unit. The obtaining unit is further configured to, when the transceiver is in a power-on state, obtain a third ambient temperature by the communications device. The third ambient temperature is a current ambient temperature. The storage unit is configured to, when a difference between the third ambient temperature and a first preset temperature falls within a preset range, save a running parameter corresponding to the transceiver as the first parameter. The control unit is further configured to control the transceiver to be powered off such that the communications device enters the warm backup state.

In a possible implementation, the apparatus further includes a determining unit. The obtaining unit is further configured to, when the transceiver is in a power-on state, obtain an ambient temperature in a preset time period. The determining unit is configured to, when the ambient temperature in the preset time period converges, determine the first preset temperature based on the ambient temperature in the preset time period, where the first preset temperature is an average value or an intermediate value of the ambient temperature in the preset time period.

In a possible implementation, the obtaining unit is further configured to determine the first parameter based on a first ambient temperature and a stored correspondence table. The correspondence table includes a correspondence between the first ambient temperature and the first parameter, and the first ambient temperature is a current temperature of an environment in which the communications device is located.

In a possible implementation, the obtaining unit is further configured to obtain a running parameter corresponding to the transceiver when the transceiver is powered off at a first moment, and determine the running parameter as the first parameter. There is no power-on operation on the transceiver from the first moment to a current moment.

In a possible implementation, the obtaining unit further includes: a first obtaining subunit, configured to obtain a first ambient temperature and a second ambient temperature, where the first ambient temperature is a current temperature of an environment in which the first device is located, and the second ambient temperature is an ambient temperature corresponding to the transceiver when the transceiver is powered off at the first moment; a second obtaining subunit, configured to obtain a correction parameter based on a difference between the first ambient temperature and the second ambient temperature; and a correction subunit, configured to correct the running parameter using the correction parameter, to obtain the first parameter.

In a possible implementation, the first parameter includes a startup parameter and/or a calibration parameter, the startup parameter is used to indicate the transceiver to be started based on the startup parameter, and the calibration parameter is used to calibrate the transceiver.

In a possible implementation, the control unit is further configured to, when the communications device exits the warm backup state, control a heat dissipation device to run in a first working mode. Heat dissipation efficiency of the heat dissipation device in the first working mode is higher than preset heat dissipation efficiency.

In a possible implementation, the control unit is further configured to, when a preset condition is met, control the heat dissipation device to run in a second working mode. The heat dissipation efficiency of the heat dissipation device in the first working mode is higher than heat dissipation efficiency of the heat dissipation device in the second working mode, and the preset condition includes that working duration of the heat dissipation device in the first working mode reaches preset duration or a working temperature of the transceiver is lower than a second preset temperature.

In a possible implementation, the trigger condition includes: (a) An active/standby switchover is performed, where a second device is an active device, and the communications device is a standby device; or (b) a difference between two adjacent first preset temperatures is greater than a first preset temperature difference; or (c) a power-on condition preconfigured by a user is met; or (d) a difference between a real-time ambient temperature value and the first preset temperature is greater than a second preset temperature difference.

In a possible implementation, the obtaining unit is further configured to read the first parameter locally, or obtain the first parameter from an external device.

According to a third aspect of the embodiments of this application, a communications device is provided. The device includes: a processor and a memory, where the memory is configured to store instructions or a computer program, and the processor is configured to execute the instructions or the computer program in the memory such that the communications device performs the method according to the first aspect.

According to a fourth aspect of the embodiments of this application, a computer-readable storage medium is provided, and includes an instruction or a computer program. When the instruction or the computer program is run on a computer, the computer is enabled to perform the method according to the first aspect.

According to the technical solutions provided in this application, when the active device works normally, the first device serving as the standby device is in the warm backup state, that is, the transceiver of the first device is in a power-off low power consumption state. When the first device is in the warm backup state, the first device is in a totally zero-traffic state or near-zero-traffic state. This reduces energy consumption. The first device obtains the first parameter in response to the trigger condition, and quickly controls, using the first parameter, the transceiver to be powered on such that the first device exits the warm backup state, and the first device can receive and process service traffic. The first parameter is a working parameter that is used to start the transceiver and that is pre-stored by the first device. It can be learned that, in the embodiments of this application, the transceiver is quickly started in a manner of pre-storing the first parameter such that the first device quickly enters a working state, and the transceiver can work reliably without a plurality of times of parameter adjustment. This improves service processing efficiency and an active/standby reliability protection capability.

BRIEF DESCRIPTION OF DRAWINGS

To describe the technical solutions in the embodiments of this application or in the conventional technology more clearly, the following describes the accompanying drawings used in describing the embodiments or the conventional technology. It is clear that the accompanying drawings in the following descriptions show embodiments of this application, and persons of ordinary skill in the art may further derive other accompanying drawings from these accompanying drawings without creative efforts.

DESCRIPTION OF EMBODIMENTS

Figure 1:
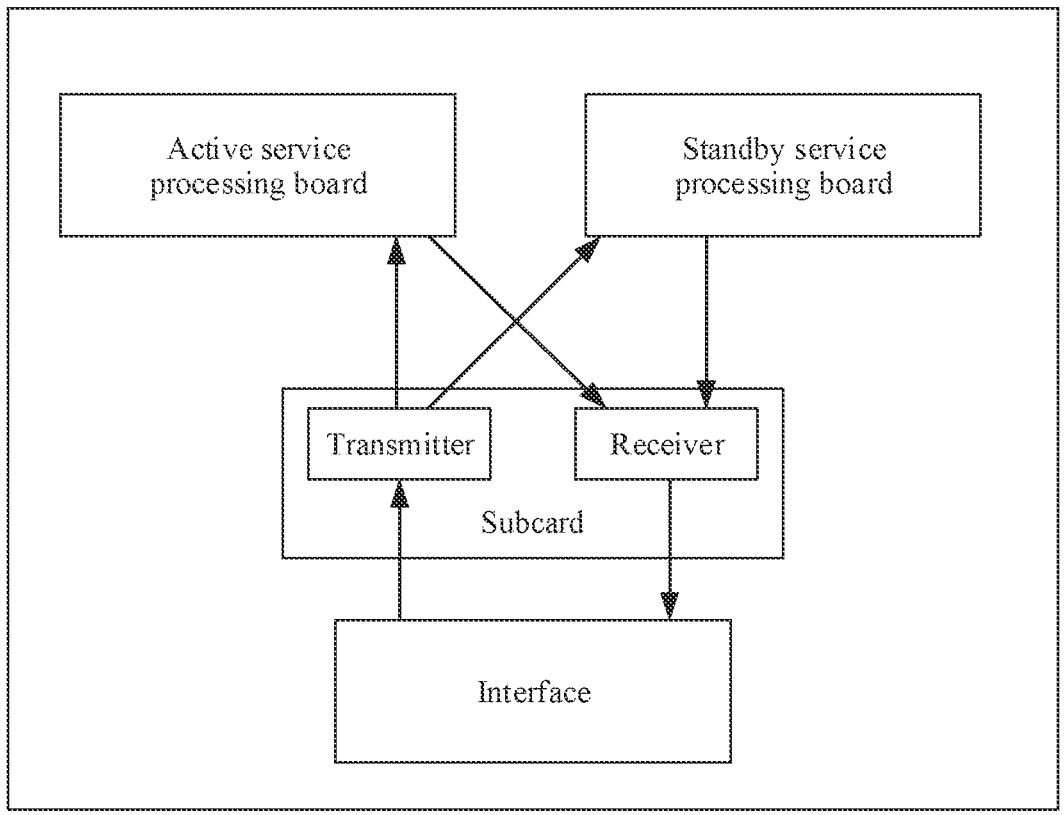
FIG. 1 is a schematic structural diagram of a provided active/standby service processing board.

To make persons skilled in the art understand the technical solutions in the present disclosure better, the following describes the technical solutions in the embodiments of the present disclosure with reference to the accompanying drawings in the embodiments of the present disclosure. It is clear that the described embodiments are merely a part rather than all of the embodiments of the present disclosure.

Currently, to maintain active/standby reliability, transmit and receive links between a standby service processing board and a subcard are usually disabled such that traffic on the standby service processing board is zero and no traffic processing is performed, thereby implementing energy saving. When an active service processing board is faulty, the transmit and receive links need to be enabled. However, it may take hundreds of milliseconds to enable the links until the links may work in a stable state. Consequently, an active/standby switchover takes relatively long time, which may cause a service loss and increase a service processing delay.

Based on this, an embodiment of this application provides a communications device control method. When a first device needs to exit a warm backup state, the first device obtains a prestored first parameter. The first parameter may indicate a transceiver to run based on the first parameter. The first device controls the transceiver to be powered on using the first parameter such that the transceiver can quickly enter a stable state to run based on the first parameter. This reduces time spent in gradually adjusting a running parameter after the transceiver is powered on, and ensures that the first device can quickly perform service processing, to further ensure data transmission reliability.

For ease of understanding implementations of the embodiments of this application, the following describes physical devices and technical terms in the embodiments of this application.

In this application, a first device and a second device form an active/standby relationship. The first device is a standby device, and the second device is an active device. The first device and the second device may be two independent communications devices, or may be two functional modules that have a service processing capability in a communications device.

A warm backup state indicates that the first device is in a power-on state and a transceiver of the first device is in a power-off state. That the transceiver of the first device is in a power-off state may be that all transceivers corresponding to the first device are in a power-off state. In this state, the first device cannot obtain traffic from a subcard, and is in a totally zero-traffic working state. Alternatively, some transceivers (for example, 90% of the transceivers) corresponding to the first device are in a power-off state. In this state, the first device obtains a small amount of traffic from the subcard using the other transceivers.

A hot backup state indicates that the first device and the transceiver of the first device are in a power-on state, where the first device can receive traffic sent by the subcard, and process the received traffic. In this state, the subcard does not forward traffic sent by the first device to an interface.

The transceiver is configured to receive and send data, and may include a receiver and a transmitter. Further, the transceiver may be any existing device with a transceiver function. For example, the transceiver may be a serializer/deserializer (Serdes).

The following describes, with reference to the accompanying drawings, the technical solutions provided in the embodiments of this application.

Figure 2:
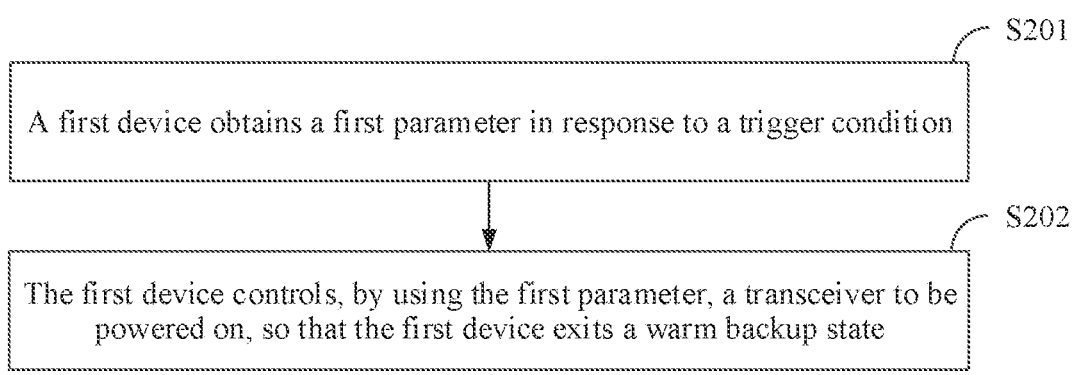
FIG. 2 is a flowchart of a communications device control method according to an embodiment of this application.

FIG. 2 is a flowchart of a communications device control method according to an embodiment of this application. As shown in FIG. 2, the method may include the following steps.

S201: A first device obtains a first parameter in response to a trigger condition.

In this embodiment, before the trigger condition occurs, the first device is in a warm backup state. The warm backup state indicates that a transceiver of the first device is in a power-off low power consumption state. That is, the first device cannot use the transceiver to receive a packet sent by another device or send a packet to the other device, and is in a zero-traffic working state. When the trigger condition occurs, the first device may obtain the first parameter. The first parameter may indicate the transceiver to run based on the first parameter. The trigger condition may include that a second device serving as an active device is faulty and an active/standby switchover needs to be performed. Alternatively, a difference between two adjacent first preset temperatures is greater than a first preset temperature difference. Alternatively, a difference between a real-time ambient temperature and a first preset temperature is greater than a second preset temperature difference. The first preset temperature is a temperature corresponding to the first device when the first device can be powered off, and that the first device can be powered off indicates that the first device corresponds to an optimal running state when the first device is powered on again. Determining of the first preset temperature is described in a subsequent embodiment. Specific values of the first preset temperature difference and the second preset temperature difference may be the same or different, and may be further set based on an application situation.

An implementation in which the first device obtains the first parameter may include: In a manner, the first device determines the first parameter based on a first ambient temperature and a stored correspondence table. The correspondence table includes a correspondence between the first ambient temperature and the first parameter, and the first ambient temperature is a current temperature of an environment in which the first device is located. A specific implementation in which the first device establishes the correspondence table is described in a subsequent embodiment.

In another manner, the first device obtains a running parameter corresponding to the transceiver when the transceiver is powered off at a first moment, and determines the running parameter as the first parameter. There is no power-on operation on the transceiver from the first moment to a current moment. That is, the first device uses the running parameter corresponding to the transceiver when the transceiver is powered off most recently as the first parameter. A specific implementation in which the first device saves the running parameter corresponding to the transceiver when the transceiver is powered off most recently is described in a subsequent embodiment.

Because the running parameter of the transceiver is affected by a temperature, when the transceiver is controlled to be powered on, the first parameter used by the first device need to match a current ambient temperature, to ensure that the transceiver can work stably. Therefore, when obtaining the running parameter corresponding to the transceiver when the transceiver is powered off at the first moment, the first device may obtain a first ambient temperature and a second ambient temperature, where the first ambient temperature is a current temperature of an environment in which the first device is located, and the second ambient temperature is an ambient temperature corresponding to the transceiver when the transceiver is powered off at the first moment; the first device obtains a correction parameter based on a difference between the first ambient temperature and the second ambient temperature, where the correction parameter is used to optimize and adjust the running parameter corresponding to the transceiver when the transceiver is powered off at the first moment; and the first device updates the running parameter using the correction parameter to obtain the first parameter. That is, when the first device obtains a running parameter corresponding to the first moment, to ensure startup reliability of the transceiver, the first device may determine a correction parameter based on a difference between the current ambient temperature and an ambient temperature corresponding to the first moment, and uses the correction parameter to correct the running parameter corresponding to the first moment, to obtain the first parameter. In this way, the first parameter matches the current ambient temperature. Further, a correspondence between an ambient temperature difference and the correction parameter may be prestored. When determining a temperature difference between the first ambient temperature and the second ambient temperature, the first device may determine the correction parameter based on the temperature difference and the foregoing correspondence.

The first parameter may include a startup parameter and/or a calibration parameter. The startup parameter is used to indicate the transceiver to be started based on the startup parameter. For example, the startup parameter may include one or more of an amplification multiple of an amplifier in the transceiver, a filtering parameter of a filter in the transceiver, or the like. The calibration parameter is used to calibrate the transceiver. For example, the calibration parameter may include one or more of a parameter for calibrating a clock phase of the transceiver, a parameter for calibrating impedance of the transceiver, or the like.

The first device may obtain the startup parameter in the following manner.

In one manner, the first device obtains the current ambient temperature, namely, the first ambient temperature, and determines the startup parameter based on the first ambient temperature and a correspondence table. The correspondence table includes a correspondence between the first ambient temperature and the startup parameter. That is, the first device may prestore a correspondence between an ambient temperature and a startup parameter, and when the transceiver needs to be started, the first device determines a corresponding startup parameter based on the current ambient temperature and the foregoing correspondence. A one-to-one correspondence may exist between the ambient temperature and the startup parameter. For example, when the ambient temperature is 10 degrees Celsius (° C.), the corresponding startup parameter is a1; and when the ambient temperature is 11° C., the corresponding startup parameter is a2. Alternatively, a startup parameter may correspond to a specific ambient temperature range. For example, a startup parameter corresponding to [10 12] is b1, and a startup parameter corresponding to [12 14] is b2. Certainly, the correspondence between the ambient temperature and the startup parameter may alternatively be in another form. A specific implementation in which the correspondence between the ambient temperature and the startup parameter is prestored is described in a subsequent embodiment. In some embodiments, the correspondence table may be prestored in the first device, or another device or a storage medium that communicates with the first device.

In another manner, the first device obtains a second parameter other than the calibration parameter in the running parameter corresponding to the transceiver when the transceiver is powered off at the first moment, and the first device uses the second parameter as the startup parameter. The first moment is a moment corresponding to a most recent power-off operation, and there is no power-on operation on the transceiver from the first moment to a current moment. In some embodiments, the first device uses a running parameter corresponding to the transceiver when the transceiver is powered off most recently as the startup parameter, and the startup parameter is used to control the transceiver to be powered on this time. In some embodiments, because stable working of the transceiver is related to a temperature, to ensure that the startup parameter can adapt to the current temperature of the environment in which the first device is located, the first device obtains the first ambient temperature and the second ambient temperature before controlling, using a parameter backed up during last power-off, the transceiver to be powered on. The first ambient temperature is the current ambient temperature, and the second ambient temperature is the ambient temperature when the transceiver is powered off most recently. The first device determines a first correction parameter based on the difference between the first ambient temperature and the second ambient temperature, and corrects, using the first correction parameter, a running parameter corresponding to the transceiver when the transceiver starts to be powered off, to obtain a corrected startup adaptive parameter such that the transceiver is started using the corrected startup adaptive parameter. In this way, the corrected startup adaptive parameter can match the current ambient temperature such that the transceiver quickly enters a stable working state. A specific implementation in which the first device backs up the parameter corresponding to the transceiver when the transceiver is powered off most recently is described in a subsequent embodiment.

The first device may obtain the calibration parameter in the following manner.

Generally, after the transceiver is powered on, parameters such as a clock phase and impedance need to be calibrated such that the transceiver works in a stable state. Usually, calibration needs to be performed step by step, which consumes tens of milliseconds. This affects fast startup of the transceiver. Based on this, fast calibration is implemented in a table lookup manner in this embodiment of this application.

In a manner, a correspondence between a temperature and the calibration parameter is obtained in advance, to establish a correspondence table. When the transceiver needs to be calibrated, the current ambient temperature, that is, the first ambient temperature, is obtained; a corresponding calibration parameter is found in the correspondence table based on the first ambient temperature; and the transceiver is calibrated using the calibration parameter. In this case, step-by-step calibration is avoided, and a startup rate of the transceiver is improved.

In another manner, the first device obtains a calibration parameter corresponding to the transceiver when the transceiver is powered off most recently, and calibrates the transceiver using the calibration parameter such that the transceiver can be quickly powered on. Because the calibration parameter corresponding to the transceiver when the transceiver works reliably is related to a temperature, to ensure that an ambient temperature corresponding to the transceiver when the transceiver is calibrated matches an ambient temperature of the backup calibration parameter, before the first device calibrates the transceiver using the calibration parameter, the first device obtains the current ambient temperature, namely, the first ambient temperature, and the second ambient temperature when the transceiver is powered off most recently; the first device obtains a second correction parameter based on the difference between the first ambient temperature and the second ambient temperature; and the first device corrects the backup calibration parameter using the second correction parameter to obtain a corrected calibration parameter, to calibrate the transceiver using the corrected calibration parameter.

Further, the first parameter may be stored in a local register of the first device, and when the first parameter needs to be obtained, the first device reads the first parameter from the local register. Alternatively, the first parameter may be stored in an external device, and when the first parameter needs to be obtained, the first device may obtain the first parameter from the external device. The external device is a device with a storage function, and may be an independent storage device or a storage module in another device.

S202: The first device controls, using the first parameter, the transceiver to be powered on such that the first device exits the warm backup state.

In this embodiment, after obtaining the first parameter, the first device may control, using the first parameter, the transceiver to be powered on such that the transceiver quickly enters a stable working state, and the first device exits the warm backup state.

When the trigger condition is that an active/standby switchover needs to be performed, the first device exits the warm backup state, enters a normal working state, and receives and processes service traffic. In this case, a subcard corresponding to the first device sends the processed service traffic to another device. Alternatively, when the trigger condition is that the active/standby switchover is not performed, the first device exits the warm backup state and enters a hot backup state. In this case, the first device receives and processes received service traffic, but a subcard corresponding to the first device does not send the processed service traffic to another device, and the first device is still in a backup mode. That the active/standby switchover is not performed includes that the difference between the two adjacent first preset temperatures is greater than the first preset temperature difference, or a power-on condition preconfigured by a user is met, or the difference between a real-time ambient temperature value and the first preset temperature is greater than the second preset temperature difference.

It can be learned from the foregoing description that the transceiver is quickly started in a manner of pre-storing the first parameter such that the first device quickly enters a working state, and the transceiver can work reliably without a plurality of times of parameter adjustment. This improves service processing efficiency and an active/standby reliability protection capability.

In a specific implementation, when the first device is in a warm backup state, the first device has good characteristics of low power consumption and energy saving. When the first device switches from the warm backup state to the hot backup state, that is, when the transceiver is controlled to be powered on, this power-on process is relatively fast, and usually consumes tens of milliseconds. In this case, power consumption of the transceiver changes sharply such that a junction temperature of a chip corresponding to the transceiver changes greatly, to affect normal working of the first device and packaging reliability. To suppress a relatively large temperature change of a junction temperature of the chip when the first device switches from the warm backup state to the hot backup state, an embodiment of this application provides a control method. According to the method, when the first device exits the warm backup state, the first device controls a heat dissipation device to run in a first working mode. Heat dissipation efficiency of the heat dissipation device in the first working mode is higher than preset heat dissipation efficiency. For example, the heat dissipation device is a fan, and in the first working mode, a rotational speed of the fan is greater than a preset rotational speed. For example, the heat dissipation device is a condensing device, and in the first working mode, a flow rate of a condensing agent in the condensing device is greater than a preset flow rate. When a preset condition is met, the first device controls the heat dissipation device to run in a second working mode. The heat dissipation efficiency of the heat dissipation device in the first working mode is higher than heat dissipation efficiency of the heat dissipation device in the second working mode. For example, the heat dissipation device is a fan, and a rotational speed of the fan in the first working mode is greater than a rotational speed of the fan in the second working mode. The preset condition may include that working duration of the heat dissipation device in the first working mode reaches preset duration, or a working temperature of the transceiver is less than a second preset temperature. According to the method, the temperature change of the junction temperature of the chip is suppressed by improving heat dissipation efficiency of the heat dissipation device. For example, when the first device exits the warm backup state, the first device controls the heat dissipation device to run in a manner with highest heat dissipation efficiency. After the heat dissipation device runs in a manner with highest heat dissipation efficiency for half an hour, the first device controls the heat dissipation device to run in a manner less than the highest heat dissipation efficiency. If the heat dissipation device is a fan, when the first device exits the warm backup state, the fan runs in a full rotation manner; and after the fan runs in a full rotation manner for half an hour, the first device controls the fan to run in a manner less than full rotation.

When the running parameter of the transceiver matches a parameter of a physical link, the transceiver works stably, and the running parameter is affected by the ambient temperature. To enable the transceiver to quickly enter a stable state, when the transceiver is controlled to be powered on, the transceiver may start to be powered on using the running parameter that matches the parameter of the physical link. How to obtain an optimal running parameter is described below with reference to the accompanying drawings.

Figure 3:
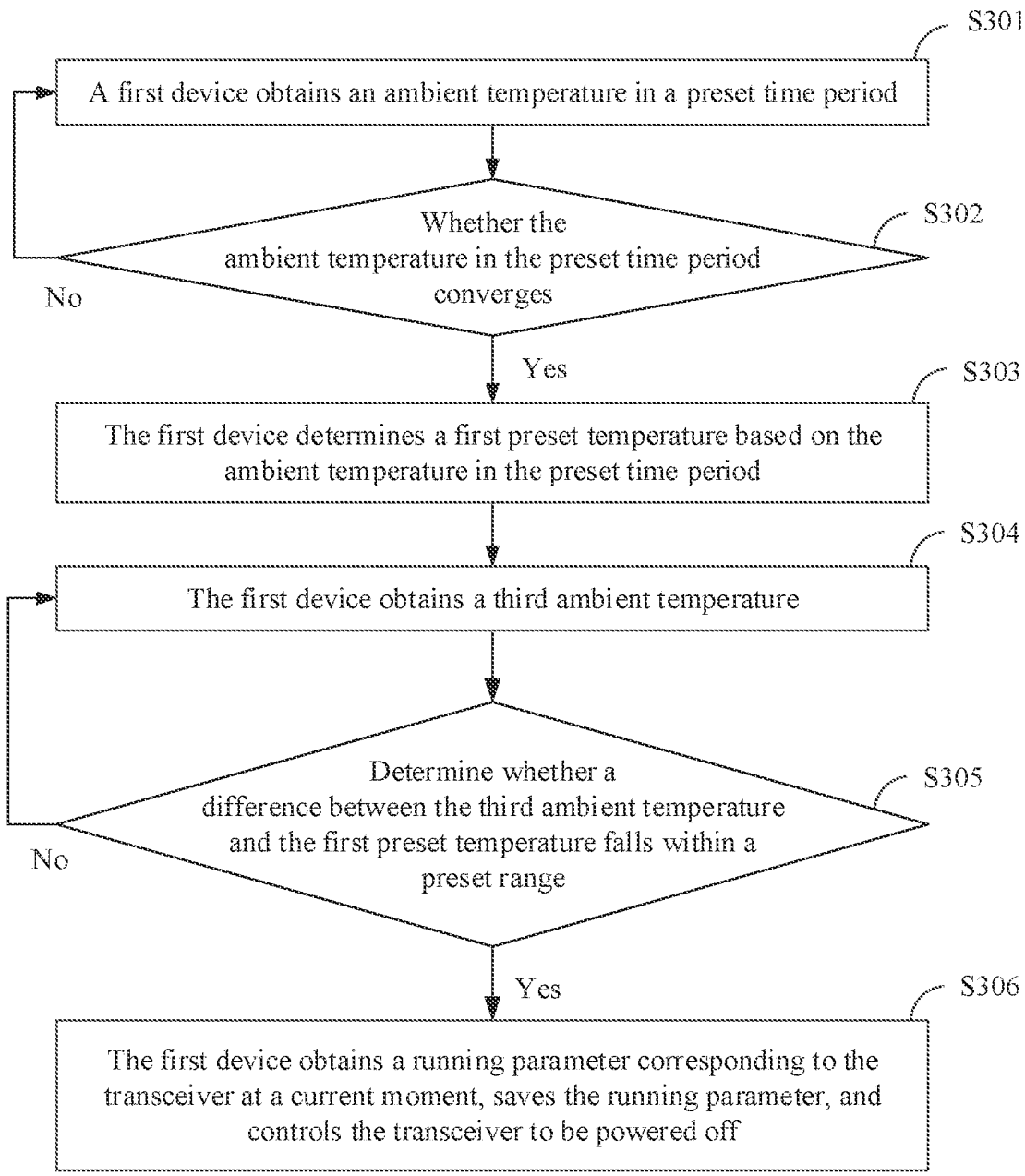
FIG. 3 is a flowchart of a method of obtaining a first parameter according to an embodiment of this application.

FIG. 3 is a flowchart of a method of obtaining a first parameter according to an embodiment of this application. As shown in FIG. 3, the method may include the following steps.

S301: A first device obtains an ambient temperature in a preset time period.

In this embodiment, when the first device is in a hot backup state, that is, when a transceiver of the first device is in a power-on state, the first device may obtain the ambient temperature in the preset time period using a temperature sensor, to obtain, using the ambient temperature collected in the preset time period, an ambient temperature corresponding to the first device when the first device works. The preset time period may be determined based on an application situation, for example, one week.

S302: The first device determines whether the ambient temperature in the preset time period converges. If yes, S303 is performed; otherwise, step S301 is performed again.

After obtaining the ambient temperature in the preset time period, the first device may determine whether an ambient temperature when the first device works converges. Convergence is used to indicate that the ambient temperature when the first device works changes stably within a specific temperature range. For example, a convergence range is [0° C., 20° C.]. When the first device works normally, an ambient temperature corresponding to the first device changes between 0° C. and 20° C. When it is determined that the ambient temperature corresponding to the first device when the first device works converges, S303 is performed. If the ambient temperature does not converge, it indicates that the ambient temperature corresponding to the first device when the first device works changes largely, and then ambient temperature is continuously collected until the ambient temperature changes relatively stably.

S303: The first device determines a first preset temperature based on the ambient temperature in the preset time period.

When determining that the ambient temperature converges, the first device determines, based on the collected ambient temperature, the first preset temperature, namely, an average value or an intermediate value corresponding to an ambient temperature change range. For example, if the ambient temperature converges within [0° C., 20° C.], the first preset temperature may be 10° C.

It should be noted that, when the first device is in a warm backup state, the first device may also continue to perform operations in S301 and S302, to determine the first preset temperature in real time.

S304: The first device obtains a third ambient temperature.

S305: The first device determines whether a difference between the third ambient temperature and the first preset temperature falls within a preset range. If yes, S306 is performed; and if no, S304 is performed.

S306: The first device obtains a running parameter corresponding to the transceiver at a current moment, stores the running parameter as a first parameter, and controls the transceiver to be powered off.

The first device obtains, in real time, a current ambient temperature, namely, the third ambient temperature. In addition, the first device determines a difference between the third ambient temperature and the first preset temperature. When the difference between the third ambient temperature and the first preset temperature falls within the preset range, it indicates that the current ambient temperature is close to the first preset temperature. In this case, the first device backs up the running parameter corresponding to the transceiver at the current moment, stores the running parameter as the first parameter, and controls the transceiver to be powered off such that the first device enters the warm backup state. When the first device needs to exit the warm backup state at a moment, the first device may control the transceiver to be powered on using the pre-backed up first parameter such that the transceiver can quickly enter a stable working state using the first parameter.

It should be noted that, because the running parameter when the transceiver works stably is related to a temperature, when it is determined that the ambient temperature when the first device works converges, in this embodiment, the first preset temperature is determined, the running parameter corresponding to the transceiver at the first preset temperature is backed up, and the transceiver restarts using the running parameter corresponding to the first preset temperature. This avoids affecting stable working of the transceiver due to a relatively large temperature difference.

In a specific implementation, when backing up the first parameter, the first device may further back up an ambient temperature corresponding to the transceiver when the transceiver is powered off, and establish a correspondence between the ambient temperature and the first parameter. When the transceiver needs to be powered on and be started again, the first device may determine the first parameter based on a current ambient temperature and the correspondence, to control the transceiver to be powered on using the first parameter. This further ensures that the transceiver can quickly enter a stable state, and enables the first device to exit the warm backup state.

In a specific implementation, when the first device enters the hot backup state from the warm backup state, the first device may re-perform operations in S301 to S303, to re-determine the first preset temperature. When the difference between the third ambient temperature and the first preset temperature falls within the preset range, the current running parameter corresponding to the transceiver is backed up, and the transceiver is controlled to be powered off.

That is, in this embodiment, the first device may back up the running parameter corresponding to the transceiver at the first preset temperature as an optimal parameter, and then when the transceiver needs to be started, the first device performs fast startup using the parameter. In this case, the transceiver does not need to consume time to perform an adaptive operation to obtain a startup parameter that matches the current ambient temperature.

Based on the foregoing method embodiments, an embodiment of this application provides a control apparatus. The following describes the control apparatus with reference to the accompanying drawings.

Figure 4:
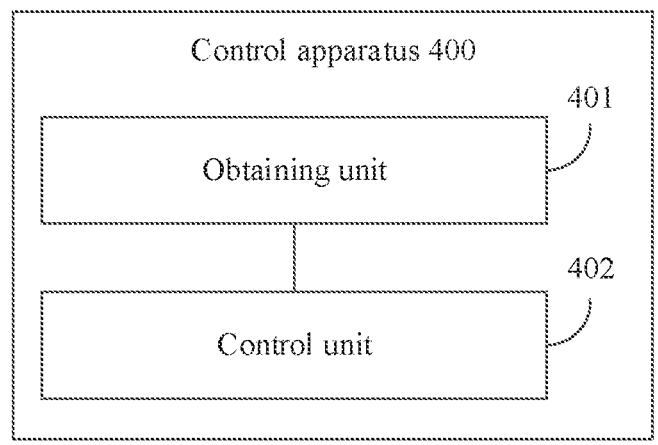
FIG. 4 is a schematic structural diagram of a communications device control apparatus according to an embodiment of this application.

FIG. 4 is a schematic structural diagram of a control apparatus according to an embodiment of this application. The apparatus 400 is applied to a first device to perform functions of the first device in FIG. 2 or FIG. 3, and may include: an obtaining unit 401, configured to obtain a first parameter in response to a trigger condition by a communications device in a warm backup state, where the warm backup state indicates that a transceiver of the communications device is in a power-off state, and the first parameter is used to indicate the transceiver to run based on the first parameter; and a control unit 402, configured to control, using the first parameter, the transceiver to be powered on such that the communications device exits the warm backup state.

In a possible implementation, the apparatus further includes a storage unit.

The obtaining unit 401 is further configured to, when the transceiver is in a power-on state, obtain a third ambient temperature by the first device. The third ambient temperature is a current ambient temperature.

The storage unit is configured to, when a difference between the third ambient temperature and a first preset temperature falls within a preset range, save a running parameter corresponding to the transceiver as the first parameter.

The control unit 402 is further configured to control the transceiver to be powered off such that the communications device enters the warm backup state.

In a possible implementation, the apparatus further includes a determining unit (not shown in FIG. 4).

The obtaining unit 401 is further configured to, when the transceiver is in a power-on state, obtain an ambient temperature in a preset time period.

The determining unit is configured to, when the ambient temperature in the preset time period converges, determine the first preset temperature based on the ambient temperature in the preset time period. The first preset temperature is an average value or an intermediate value of the ambient temperature in the preset time period.

In a possible implementation, the obtaining unit 401 is further configured to determine the first parameter based on a first ambient temperature and a stored correspondence table. The correspondence table includes a correspondence between the first ambient temperature and the first parameter, and the first ambient temperature is a current temperature of an environment in which the first device is located.

In a possible implementation, the obtaining unit 401 is further configured to obtain a running parameter corresponding to the transceiver when the transceiver is powered off at a first moment, and determine the running parameter as the first parameter. There is no power-on operation on the transceiver from the first moment to a current moment.

In a possible implementation, the obtaining unit 401 further includes: a first obtaining subunit, configured to obtain a first ambient temperature and a second ambient temperature, where the first ambient temperature is a current temperature of an environment in which the first device is located, and the second ambient temperature is an ambient temperature corresponding to the transceiver when the transceiver is powered off at the first moment; a second obtaining subunit, configured to obtain a correction parameter based on a difference between the first ambient temperature and the second ambient temperature; and a correction subunit, configured to correct the running parameter using the correction parameter, to obtain the first parameter.

In a possible implementation, the first parameter includes a startup parameter and/or a calibration parameter, the startup parameter is used to indicate the transceiver to be started based on the startup parameter, and the calibration parameter is used to calibrate the transceiver.

In a possible implementation, the control unit is further configured to, when the communications device exits the warm backup state, control a heat dissipation device to run in a first working mode. Heat dissipation efficiency of the heat dissipation device in the first working mode is higher than preset heat dissipation efficiency.

In a possible implementation, the control unit is further configured to, when a preset condition is met, control the heat dissipation device to run in a second working mode. The heat dissipation efficiency of the heat dissipation device in the first working mode is higher than heat dissipation efficiency of the heat dissipation device in the second working mode, and the preset condition includes that working duration of the heat dissipation device in the first working mode reaches preset duration or a working temperature of the transceiver is lower than a second preset temperature.

In a possible implementation, the trigger condition includes: An active/standby switchover needs to be performed, where before the active/standby switchover, a second device is an active device, and the first device is a standby device; or a difference between two adjacent first preset temperatures is greater than a first preset temperature difference; or a power-on condition preconfigured by a user is met; or a difference between a real-time ambient temperature value and the first preset temperature is greater than a second preset temperature difference.

In a possible implementation, the obtaining unit 401 is further configured to read the first parameter locally, or obtain the first parameter from an external device.

For specific executable functions and implementations of the control apparatus 400, refer to corresponding descriptions about the first device in the embodiments shown in FIG. 2 and FIG. 3. Details are not described herein again.

Figure 5:
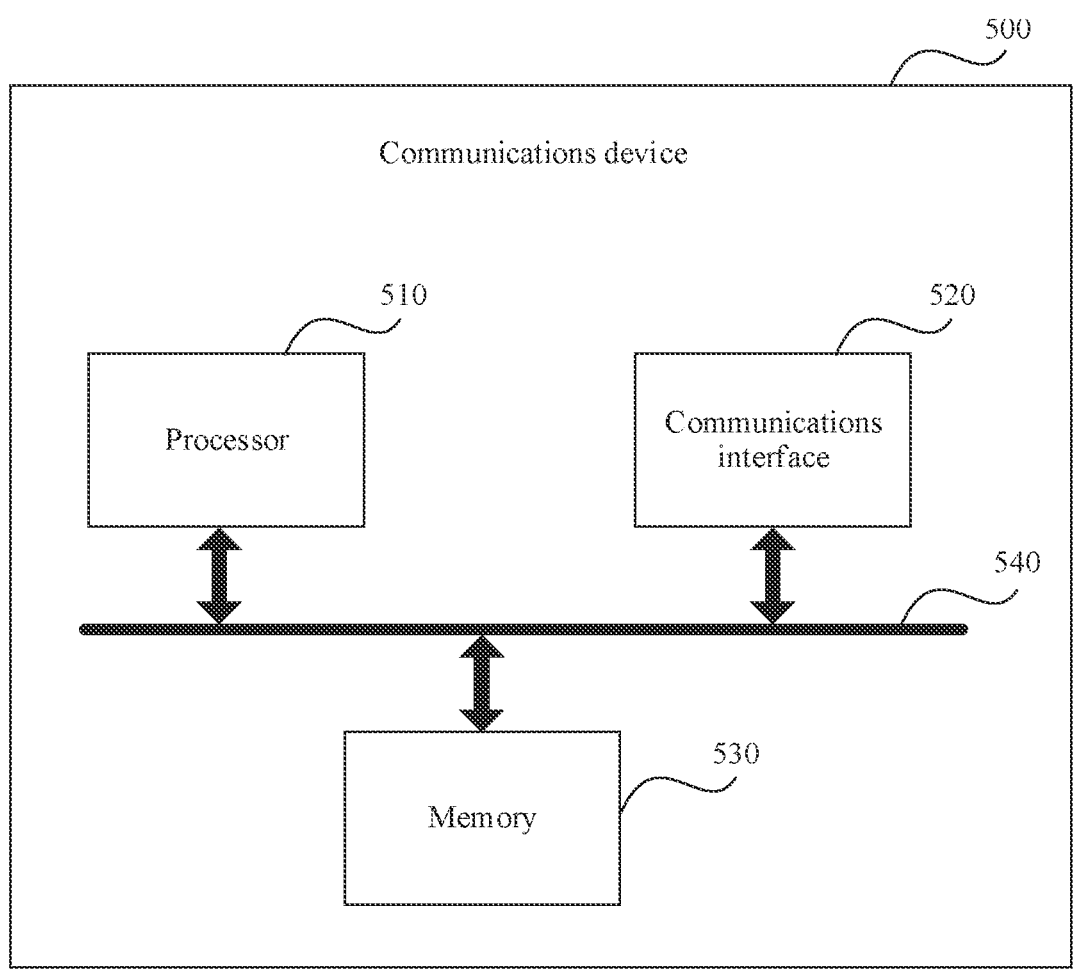
FIG. 5 is a structural diagram of a communications device according to an embodiment of this application.

FIG. 5 is a schematic structural diagram of a communications device according to an embodiment of this application. The communications device may be, for example, the first device in the embodiments shown in FIG. 2 and FIG. 3, or may be a device implementation of the control apparatus in the embodiment shown in FIG. 4.

As shown in FIG. 5, a communications device 500 includes a processor 510, a communications interface 520, and a memory 530. There may be one or more processors 510, and FIG. 5 shows one processor as an example. In this embodiment of this application, the processor 510, the communications interface 520, and the memory 530 may be communicatively connected using a bus system or in another manner, and are connected through a bus system 540 as an example in FIG. 5.

The processor 510 may be a central processing unit (CPU), a network processor (NP), or a combination of the CPU and the NP. The processor 510 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communications interface 520 is configured to receive and send a packet. Further, the communications interface 520 may include a receiving interface and a sending interface. The receiving interface may be configured to receive a packet, and the sending interface may be configured to send a packet. There may be one or more communications interfaces 520.

The memory 530 may include a volatile memory, for example, a random-access memory (RAM). The memory 530 may alternatively include a nonvolatile memory, for example, a flash memory, a hard disk drive (HDD), or a solid-state drive (SSD). The memory 530 may further include a combination of the foregoing types of memories.

Optionally, the memory 530 stores an operating system and a program, an executable module, or a data structure, or a subset thereof, or an extended set thereof. The program may include various operation instructions, used to implement various operations. The operating system may include various system programs, to implement various basic services and process hardware-based tasks. The processor 510 may read the program in the memory 530, to implement the communications device control method provided in this embodiment of this application.

The memory 530 may be a storage component in the communications device 500, or may be a storage apparatus independent of the communications device 500.

The bus system 540 may be a peripheral component interconnect (PCI) or PCIe bus, an Extended Industry Standard Architecture (EISA) bus, or the like. The bus system 540 may be classified into an address bus, a data bus, a control bus, and the like. For ease of representation, only one thick line is used to represent the bus in FIG. 5, but this does not mean that there is only one bus or only one type of bus.

In addition, an embodiment of this application further provides a computer-readable storage medium, including instructions. When the instructions are run on a computer, the computer performs the foregoing communications device control method.

In the specification, claims, and accompanying drawings of this application, the terms "first", "second", "third", "fourth", and the like (if any) are intended to distinguish between similar objects but do not necessarily indicate a specific order or sequence. It should be understood that the data termed in such a way are interchangeable in proper cases such that the embodiments described herein can be implemented in other orders than the order illustrated or described herein. Moreover, the terms "include", "contain", and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division during implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a universal serial bus (USB) flash drive, a removable hard disk, a read-only memory (ROM), a random access memory (RAM), a magnetic disk, or an optical disc.

Persons skilled in the art should be aware that in the foregoing one or more examples, services described in the present disclosure may be implemented by hardware, software, firmware, or any combination thereof. When the present disclosure is implemented by software, the foregoing services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the present disclosure are further described in detail. It should be understood that the foregoing descriptions are merely specific implementations of the present disclosure.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
    obtaining, in a warm backup state, a first parameter in response to a trigger condition, wherein the first parameter includes a startup parameter that instructs a transceiver of a communications device to be started from a low-power power-off state, wherein the startup parameter comprises at least one of a gain of an amplifier in the transceiver or a filtering parameter in the transceiver, wherein the warm backup state indicates that the communications device is in a power-on state and the transceiver is in the low-power power-off state before occurrence of the trigger condition, wherein the low-power power-off state indicates that the transceiver cannot receive and transmit network traffic, wherein the trigger condition indicates that an active switchover or a standby switchover is to be performed between a second communications device that is faulty and the communications device, wherein the second communications device is an active device and the communications device is a backup device, and wherein the first parameter indicates that the transceiver is to run based on the startup parameter; and
    instructing the transceiver to be powered on using the first parameter to cause the communications device to exit the warm backup state.

2. The method of claim 1, wherein before obtaining the first parameter in response to the trigger condition, the method further comprises:
    obtaining an ambient temperature when the transceiver is in a power-on state, wherein the ambient temperature is a current ambient temperature; and
    saving, a running parameter corresponding to the transceiver as the first parameter and controlling the transceiver to be powered off when a difference between the ambient temperature and a first preset temperature falls within a preset range.

3. The method of claim 2, further comprising:
    obtaining a second ambient temperature in a preset time period when the transceiver is in a power-on state; and
    obtaining the first preset temperature based on the second ambient temperature in the preset time period when the second ambient temperature converges, wherein the first preset temperature is an average value or an intermediate value of the second ambient temperature.

4. The method of claim 1, further comprising obtaining the first parameter based on a first ambient temperature and a correspondence table, wherein the correspondence table comprises a correspondence between the first ambient temperature and the first parameter, and wherein the first ambient temperature is a current temperature of an environment in which the communications device is located.

5. The method of claim 1, further comprising:
    obtaining a running parameter corresponding to the transceiver when the transceiver is powered off at a first moment, and
    setting the running parameter as the first parameter, wherein there is no power-on operation on the transceiver from the first moment to a current moment.

6. The method of claim 5, further comprising:
    obtaining a first ambient temperature and a second ambient temperature, wherein the first ambient temperature is a current temperature of an environment in which a communications device control apparatus is located, and wherein the second ambient temperature is an ambient temperature of the transceiver when the transceiver is powered off at the first moment;
    obtaining a correction parameter based on a difference between the first ambient temperature and the second ambient temperature;
    correcting the running parameter using the correction parameter; and
    obtaining the first parameter based on the correction parameter.

7. The method of claim 1, wherein the first parameter further comprises a calibration parameter, and wherein the method further comprises calibrating the transceiver using the calibration parameter.

8. The method of claim 1, further comprising controlling a heat dissipation device to run in a first working mode when a communications device control apparatus exits the warm backup state, wherein heat dissipation efficiency of the heat dissipation device in the first working mode is higher than a preset heat dissipation efficiency.

9. The method of claim 8, further comprising controlling the heat dissipation device to run in a second working mode when a preset condition is met, wherein the heat dissipation efficiency of the heat dissipation device in the first working mode is higher than heat dissipation efficiency of the heat dissipation device in the second working mode, and wherein the preset condition is that a working duration of the heat dissipation device in the first working mode reaches a preset duration or a working temperature of the transceiver is lower than a second preset temperature.

10. The method of claim 1, further comprising reading the first parameter locally or obtaining the first parameter from an external device.

11. A communications device control apparatus, comprising:
    one or more processors; and
    a memory coupled to the one or more processors and configured to store instructions that when executed by the one or more processors, cause the communications device control apparatus to:
        obtain a first parameter in response to a trigger condition of a communications device in a warm backup state, wherein the first parameter includes a startup parameter that instructs a transceiver of the communications device to be started from a low-power power-off state, wherein the startup parameter comprises at least one of a gain of an amplifier in the transceiver or a filtering parameter in the transceiver, wherein the warm backup state indicates that the communications device is in a power-on state and the transceiver of the communications device is in the low-power power-off state before occurrence of the trigger condition, wherein the low-power power-off state indicates that the transceiver cannot receive and transmit network traffic, wherein the trigger condition indicates that an active switchover or a standby switchover is to be performed between a second communications device that is faulty and the communications device, wherein the second communications device is an active device and the communications device is a backup device, wherein the communications device control apparatus comprises the transceiver, and wherein the first parameter indicates that the transceiver is to run based on the startup parameter; and instruct, using the first parameter, the transceiver to be powered on to cause the communications device to exit the warm backup state.

12. The communications device control apparatus of claim 11, wherein the instructions that when executed by the one or more processors further causes the communications device control apparatus to:

obtain an ambient temperature when the transceiver is in a power-on state, wherein the ambient temperature is a current ambient temperature;

save a running parameter corresponding to the transceiver as the first parameter when a difference between the ambient temperature and a first preset temperature falls within a preset range; and control the transceiver to be powered off.

13. The communications device control apparatus of claim 12, wherein the instructions that when executed by the one or more processors further causes the communications device control apparatus to:

obtain a second ambient temperature in a preset time period when the transceiver is in a power-on state; and obtain the first preset temperature based on the second ambient temperature in the preset time period when the second ambient temperature in the preset time period converge, wherein the first preset temperature is an average value or an intermediate value of the second ambient temperature in the preset time period.

14. The communications device control apparatus of claim 11, wherein the instructions that when executed by the one or more processors further causes the communications device control apparatus to obtain the first parameter based on an ambient temperature and a stored correspondence table, wherein the correspondence table comprises a correspondence between the ambient temperature and the first parameter, and wherein the ambient temperature is a current temperature of an environment in which the communications device control apparatus is located.

15. The communications device control apparatus of claim 11, wherein the instructions that when executed by the one or more processors further causes the communications device control apparatus to:

obtain a running parameter corresponding to the transceiver when the transceiver is powered off at a first moment, and set the running parameter as the first parameter, wherein there is no power-on operation on the transceiver from the first moment to a current moment.

16. The communications device control apparatus of claim 15, wherein the instructions that when executed by the one or more processors further causes the communications device control apparatus to:

obtain a first ambient temperature and a second ambient temperature, wherein the first ambient temperature is a current temperature of an environment in which the communications device control apparatus is located, and wherein the second ambient temperature is an ambient temperature corresponding to the transceiver when the transceiver is powered off at the first moment;

obtain a correction parameter based on a difference between the first ambient temperature and the second ambient temperature;

correct the running parameter using the correction parameter; and obtain the first parameter based on the correction parameter.

17. The communications device control apparatus of claim 11, wherein the first parameter further comprises a calibration parameter, and wherein the instructions that when executed by the one or more processors further causes the communications device control apparatus to calibrate the transceiver based on the calibration parameter.

18. The communications device control apparatus of claim 11, wherein the instructions that when executed by the one or more processors further causes the communications device control apparatus to control a heat dissipation device to run in a first working mode when the communications device control apparatus exits the warm backup state, wherein heat dissipation efficiency of the heat dissipation device in the first working mode is higher than preset heat dissipation efficiency.

19. The communications device control apparatus of claim 18, wherein the instructions that when executed by the one or more processors further causes the communications device control apparatus to control the heat dissipation device to run in a second working mode when a preset condition is met, wherein the heat dissipation efficiency of the heat dissipation device in the first working mode is higher than heat dissipation efficiency of the heat dissipation device in the second working mode, and wherein the preset condition is that working duration of the heat dissipation device in the first working mode reaches a preset duration or a working temperature of the transceiver is lower than a second preset temperature.

20. The communications device control apparatus of claim 11, wherein the instructions that when executed by the one or more processors further causes the communications device control apparatus to read the first parameter locally or obtain the first parameter from an external device.

21. A computer program product comprising computer-executable instructions that are stored on a non-transitory computer-readable storage medium and that, when executed by a processor, cause a communications device control apparatus to:

obtain, in a warm backup state, a first parameter in response to a trigger condition, wherein the first parameter includes a startup parameter that instructs a transceiver of a communications device to be started from a low-power power-off state, wherein the startup parameter comprises at least one of a gain of an amplifier in the transceiver or a filtering parameter in the transceiver, wherein the trigger condition indicates an active switchover or a standby switchover is to be performed between a second communications device that is faulty and the communications device, wherein the second communications device is an active device and the communications device is a backup device, wherein the warm backup state indicates that the communications device is in a power-on state and the transceiver is in the low-power power-off state before occurrence of the trigger condition, wherein the low-power power-off state indicates that the transceiver cannot receive and transmit network traffic, wherein the communications device comprises the transceiver, and wherein the first parameter indicates the transceiver is to run based on the startup parameter; and instruct the transceiver to be powered on using the first parameter to cause the communications device to exit the warm backup state.

22. The computer program product of claim 21, wherein the computer-executable instructions that when executed by a processor further cause the communications device control apparatus to:

obtain an ambient temperature when the transceiver is in a power-on state, wherein the ambient temperature is a current ambient temperature; and save, a running parameter corresponding to the transceiver as the first parameter and controlling the transceiver to be powered off when a difference between the ambient temperature and a first preset temperature falls within a preset range.

23. The computer program product of claim 22, wherein the computer-executable instructions that when executed by a processor further cause the communications device control apparatus to:

obtain a second ambient temperature in a preset time period when the transceiver is in a power-on state; and obtain the first preset temperature based on the second ambient temperature in the preset time period when the second ambient temperature converges, wherein the first preset temperature is an average value or an intermediate value of the second ambient temperature.

\* \* \* \* \*